United States Patent [19]
Aronoff et al.

[11] 3,894,118
[45] July 8, 1975

[54] CROSSLINKING AGENTS FOR FLUOROCARBON POLYMERS

[75] Inventors: Elihu J. Aronoff, Framingham; Kewal Singh Dhami, Shrewsbury; Tsu-Chia Shieh, Framingham, all of Mass.

[73] Assignee: International Telephone & Telegraph Corporation, New York, N.Y.

[22] Filed: Jan. 21, 1974

[21] Appl. No.: 435,295

[52] U.S. Cl. ......... 260/884; 117/128.4; 204/159.17; 260/42.34; 260/87.5 B; 260/87.7; 260/92.1; 260/885; 260/900
[51] Int. Cl. ............................................. C08f 29/22
[58] Field of Search ............... 260/900, 87.5 B, 92.1, 260/87.7, 884, 885; 204/159.17

[56] References Cited
UNITED STATES PATENTS

| | | | |
|---|---|---|---|
| 3,533,930 | 10/1970 | Lawton et al. | 260/900 |
| 3,580,829 | 5/1971 | Lanza | 204/159.17 |
| 3,717,559 | 2/1973 | Oyama et al. | 204/159.17 |
| 3,769,371 | 10/1973 | Nersasian | 260/900 |

*Primary Examiner*—John C. Bleutge
*Assistant Examiner*—C. J. Seccuro
*Attorney, Agent, or Firm*—James B. Raden; Harold J. Holt

[57] ABSTRACT

High temperature processing fluorocarbon polymers having incorporated therein an ester of dimethacrylic acid as a crosslinking agent for the polymer. The crosslinking agent has the structural formula

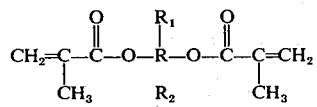

in which R is a 5 to 14 carbon atoms radical selected from the group consisting of alkyl, cycloalkyl and aralkyl; $R_1$ and $R_2$ are independently selected from the group consisting of hydrogen, alkyl, cycloalkyl, aralkyl and aryl radicals and mixtures thereof; and the total number of carbon atoms in R, $R_1$ and $R_2$ is at least 10.

11 Claims, No Drawings

CROSSLINKING AGENTS FOR FLUOROCARBON POLYMERS

This invention relates to crosslinking agents for fluorocarbon polymers and more specifically to fluorocarbon polymers which are irradiation cured in the presence of certain dimethacrylic acid esters.

It is known that high temperature resistant fluorocarbon polymers possess a combination of mechanical, dielectric and chemical properties making them particularly useful as electrical insulation materials. However, in order to maximize utilization of these fluorocarbon polymers under high temperature or overload conditions, crosslinking of the polymers is required to further increase their deformation resistance and toughness.

Crosslinking of high temperature resistant fluorocarbon polymers has presented a continuing problem since the polymers are normally processed at relatively high temperatures and chemical crosslinking agents effective under these circumstances are seriously limited. For example, it is not feasible to melt process fluorocarbon polymers such as ethylene-chlorotrifluoroethylene copolymers prior to crosslinking by employing most known chemical crosslinking agents and techniques since the chemical crosslinking systems prereact during the high temperature melt processing required for extrusion of the polymers. As a result of this prereaction, these agents are not available to provide crosslinking of the extruded products and, thus, effective crosslinking cannot be achieved. As an alternative to chemical crosslinking, irradiation crosslinking of the polymers has been studied. However, although some crosslinking of these polymers can be achieved by subjecting them to relatively massive doses of irradiation, the resulting crosslinked products are not commercially acceptable on the basis of cost and overall product properties. Accordingly, it would be highly desirable and commercially important to provide suitable crosslinking coreactants for use with fluorocarbon polymers which would enable crosslinking of these polymers with moderate doses of irradiation subsequent to high temperature processing as encountered in extrusion and certain molding techniques.

We have now found a class of crosslinking compounds for high temperature processing fluorocarbon polymers which are stable through all of the melt processing operations and readily form homogenous irradiation crosslinked systems. Processing temperature as high as 315°C (600°F) can be used without significant and detrimental thermal prereaction or volatilization during a melt processing procedure such as extrusion prior to irradiation activated curing.

The crosslinking coreactant compounds for use in the present invention are in general dimethacrylic acid esters corresponding to the structural formula FORMULA I 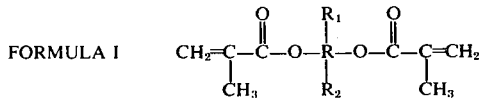

wherein R is a radical having from 5 to 14 carbon atoms and is selected from the group consisting of alkyl, cycloalkyl and aralkyl; $R_1$ and $R_2$ are independently selected from the group consisting of hydrogen, alkyl, cycloalkyl, aralkyl and aryl radicals and mixtures thereof; and the total number of carbon atoms in R, $R_1$ and $R_2$ is at least 10. As a practical matter, the total number of carbon atoms in R, $R_1$ and $R_2$ will normally not exceed 30.

These compounds possess a combination of desirable properties making them uniquely suitable for use as crosslinking coreactants for fluorocarbon polymers. Their volatility is sufficiently low and their thermal stability sufficiently high to avoid problems during the high temperature processing and fabricating operations of the polymers. They have been found to exhibit surprisingly effective and desirable plasticizing action for the polymers during the processing, enabling lower processing temperature to be used and generally facilitating extrusion or molding of the polymers. The crosslinking compounds permit irradiation at relatively low irradiation levels and result in crosslinked compounds of outstanding electrical and mechanical properties, particularly elevated temperature deformation resistance.

A particularly preferred compound useful as a crosslinking coreactant within the scope of Formula I is decamethylene glycol dimethacrylate. An additional useful dimethacrylic acid ester of an alkyl glycol is dodecamethylene glycol dimethacrylate. Suitable examples of cycloalkyl compounds are hydrogenated bisphenol-A dimethacrylate and the dimethacrylate ester of 4, 8 - bis (hydroxymethyl)-tricyclo [$5.2.1.0^{2,6}$]decane. A useful compound within the scope of Formula I in which R is aralkyl is phenylene diethanol dimethacrylate. The preferred compounds are those in which R is alkyl or cycloalkyl. It is preferred in the aralkyl compounds, that the ratio of aromatic carbons to aliphatic (or alicyclic) carbons in R be less than about 3:1 and most preferably less than about 2:1. Where R, $R_1$ and $R_2$ together contain less than 10 carbon atoms, volatility of the compounds is too great at the processing temperatures required for most of the fluorocarbon polymers. At less than about 7 carbon atoms (R, $R_1$ and $R_2$), concentration of unsaturation per weight unit addition would increase and some gelation would occur. Where R alone is above 14 carbon atoms, flexible crosslinks would result and elevated temperature deformation resistance would be impaired.

We have found that these compounds possess excellent properties as plasticizing and as crosslinking agents for high temperature processing fluorocarbon polymers, including homopolymers and copolymers such as ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluoropropylene-tetrafluoroethylene copolymers and the like. The crosslinking agents are particularly effective with fluorocarbon polymers which are processed at temperatures above 260°C such as ethylene-chlorotrifluoroethylene copolymers and blends of vinylidene fluoride-hexafluoropropylene polymers (including both copolymers and terpolymers based on vinylidene fluoride and hexafluoropropylene) with (a) polyvinylidene fluoride or (b) ethylene-chlorotrifluoroethylene copolymers. The crosslinking agents are also useful with blends of vinylidene fluoride-hexafluoropropylene polymers and ethylene-tetrafluoroethylene copolymers.

The crosslinking compounds are added in amounts sufficient to plasticize the polymer of polymer blends for processing and to impart deformation resistance upon cross-linking. This amount may range from 0.5 to 20 parts by weight per 100 parts by weight of polymer, but will normally be from 3 to 10 parts of the cross-linker per 100 parts of polymer. The polymer or polymers and crosslinking compounds are blended, processed in the melt at an elevated temperature for a period of time sufficient to melt process, but insufficient to crosslink. The formed mixture is then cooled to ambient temperature and irradiated at a dosage between, for example, about 5 to 20 megarads. It is also possible to use blends of the crosslinking compounds of Formula I with tri-unsaturated crosslinking agents such as triallyl and trimethacrylate esters. Examples are triallyl cyanurate, triallyl isocyanurate and trimethylolpropane trimethacrylate. The combined amount of crosslinking blend should be within the ranges set forth above for the crosslinking compounds.

The following examples illustrate the practice of the present invention. All parts are by weight.

EXAMPLE 1

A commercially available essentially equimolar copolymer of ethylene and chlorotrifluoroethylene was blended with 6% decamethylene glycol dimethacrylate. 1% MgO as a stabilizer was blended into the composition. The composition was then compression molded at 257°C and subjected to irradiation at 10 megarad dose under a 1.5 MEV election beam accelerator to produce a crosslinked composition having the following mechanical properties at elevated temperatures:

```
Tensile Strength/Elongation (at 20"/min.)
    at R. T. psi/%              7447/179
    at 250°C                    170/230
Hot Modulus
    (%, 250°C, 50 psi)          49
```

EXAMPLE 2

Ninety parts of an essentially equimolar copolymer of ethylene and chlorotrifluoroethylene was blended and reblended in a mixer with 10 parts of decamethylene glycol dimethacrylate to give a 200 gram sample of a powder composition. A second 200 gram sample was fluxed in a mixing head for several minutes at 243°C and then compression molded at 255°C - 260°C at about 10,000 psi ram pressure. Irradiations were done with a 2 MEV electron beam accelerator. Physical properties and aging tests were carried out by conventional procedures. Test results are shown in Tables I and II. Sample 1 was in powder form; sample 2 a fluxed blend; sample 3, as a control, contained no crosslinking additive.

TABLE I

| Dose (MR) | Mechanical Test (a) | Sample 1 | Sample 2 | Sample 3 (No additive) |
|---|---|---|---|---|
| 4 | Tensile Strength | 6324 | 6282 | 6550 |
|   | Elongation | 150 | 183 | 225 |
|   | Hot Modulus | 30 | 37 | — (b) |
| 10 | Tensile Strength | 6365 | 6705 | 6416 |
|   | Elongation | 100 | 100 | 216 |
|   | Hot Modulus | 11 | 18 | — (b) |
| 25 | Tensile Strength | 6836 | 6541 | 5609 |
|   | Elongation | 66 | 100 | 258 |
|   | Hot Modulus | 11 | 26 | 400 |

(a) Tensile Strength in psi; Elongation in % at room temperature — 20" min.; Hot Modulus in % at 250°C — 50 psi load.
(b) Specimen broke — no elongation.

TABLE II

| Sample | Dose (MR) | Mechanical Test | 0 | 72 | 120 | 168 |
|---|---|---|---|---|---|---|
| 1 | 4 | Tensile Strength (psi) | 6324 | 6052 | 5576 | 6131 |
|   |   | Elongation (%) | 150 | 100 | 150 | 100 |
|   | 10 | Tensile Strength | 6965 | 5250 | 6250 | 5937 |
|   |   | Elongation | 100 | 100 | 112 | 75 |
|   | 25 | Tensile Strength | 6836 | 6025 | 5266 | 5128 |
|   |   | Elongation | 66 | 87 | 50 | 50 |
| 2 | 4 | Tensile Strength | 6282 | 5640 | 5855 | 5320 |
|   |   | Elongation | 183 | 162 | 200 | 150 |
|   | 10 | Tensile Strength | 6705 | 5670 | 6118 | 5312 |
|   |   | Elongation | 100 | 87 | 112 | 100 |
|   | 25 | Tensile Strength | 6541 | 5125 | 5562 | 5127 |
|   |   | Elongation | 100 | 87 | 100 | 100 |

(Aging period in hours at 200°C)

Table I shows that the additives significantly increase the degree of crosslinking at equivalent radiation dose levels and markedly improve deformation resistance as measured by hot modulus. It also shows decreased radiation degradation in the presence of the crosslinking additive with increasing radiation dose. Table II demonstrates that the compounds of the invention retain a high degree of their original mechanical properties.

EXAMPLE 3

Ninety-four parts of an essentially equimolar copolymer of ethylene and chlorotrifluoroethylene was blended with six parts of hydrogenated bisphenol-A dimethacrylate as set forth in Example 2. 1% MgO was also added. It was then compression molded and irradiated at 10 megarads as set forth in that Example. The tensile strength at room temperature was 7222 psi; the elongation at room temperature was 125% (at 10 inches/min.).

Table III shows the mechanical properties at 250°C of the irradiation cured polymer of Example 3 (Sample 1) and of an additional substantially identical polymer (Sample 2), containing however six parts of decamethylene glycol dimethacrylate in place of hydrogenated bisphenol-A dimethacrylate.

TABLE III

| Sample | Tensile Strength (psi)/Elongation (%) | Hot Modulus (%) 250°C, 50 psi |
|---|---|---|
| 1 | 209/125 | 25 |
| 2 | 202/149 | 37 |

The samples of Table III were aged at 200°C. The properties after 7 and 15 days of aging respectively, and the % retention of those properties are shown in Table IV.

TABLE IV

Tensile Strength (psi)/Elongation (%) at 10" Min. & % Retention

| Sample | 0 | 7 | Days (% Retention) (After 7 days) | 15 | (% Retention) (After 15 days) |
|---|---|---|---|---|---|
| 1 | 7222/156 | 5820/131 | (81/84) | 5123/138 | 71/88.5 |
| 2 | 7161/195 | 5590/113 | (78/65) | 5390/113 | (75/65) |

The compounds of the invention possess several particularly desirable properties for the high temperature processing of fluorocarbon resins. Thermal analytical testing has shown that these compounds have excellent thermal stability and low volatility and thus can withstand the relatively high temperature involved in molding, extruding or otherwise processing the polymers. In addition, they act to plasticize the fluorocarbon polymers.

EXAMPLE 4

Torque data are generally indicative of practical processing behavior of the fluorocarbon resins. Table V illustrates the decrease in torque achieved by the incorporation of decamethylene glycol dimethacrylate into a blend of a copolymer of ethylene-chlorotrifluoroethylene and a copolymer of vinylidenefluoride and hexafluoropropylene. Comparisons are given showing equivalent torque readings for a control with no additive and for blends of other crosslinking compounds, trimethylolpropane dimethacrylate and triallyl isocyanurate with decamethylene glycol dimethacrylate. In all cases 3 grams, or 5 parts per hundred, of crosslinker were used. The torque readings were taken in a "Brabender" sigma type mixer using a 60 gram charge of polymer blend employing a temperature of 255°C at a shear rate of 80 rpm.

TABLE V

| Sample | E/CTFE[1] VF$_2$/HFP[2] (Grams) | Crosslinker | Stabilizer (MgO) | Torque (Meter-Grams) |
|---|---|---|---|---|
| 1 | 40/20 | None | None | 1425 |
| 2 | 40/20 | DMGDMA[3] | None | 1175 |
| 3 | 40/20 | TAIC[4] (1.2g) DMGDMA[3] (1.8g) | None | 1150 |
| 4 | 40/20 | TMPTMA[5] (1.2g) DMGDMA[3] (1.8g) | None | 1175 |
| 5 | 40/20 | None | 0.6g | 1475 |
| 6 | 40/20 | DMGDMA[3] | 0.6g | 1225 |
| 7 | 20/40 | None | None | 1325 |
| 8 | 20/40 | DMGDMA[3] | None | 975 |
| 9 | 20/40 | None | 1.2g | 1600 |
| 10 | 20/40 | DMGDMA[3] | 1.2g | 1225 |

[1]Ethylene/chlorotrifluoroethylene copolymer
[2]Vinylidene fluoride/hexafluoropropylene copolymer
[3]Decamethylene glycol dimethacrylate
[4]Triallyl isocyanurate
[5]Trimethylol propane trimethacrylate Table V indicates that lower torque values than the controls are obtained in each case with the crosslinking agents of the invention. The lower torque values make possible the extrusion of clear and homogeneous fluorocarbon copolymers and permit marked reduction in extrusion temperatures.

The relative crosslinking efficiency of samples shown in Table V was evaluated by crosslinking the samples at various dosage levels and determining the physical properties of the crosslinked samples. The results are set forth in Table VI. Sample numbers correspond with those of Table V.

| Sample | Irr. Dose (MR)* | Room Temp. (10"/min.) T.S. (psi) | Elong. (%) | Yield (psi) | Flexural Stress (psi)** | Crosslinkers (5 phr) 250°C (10"/min.) T.S. (psi) | Elong. (%) | Yield (psi) | Hot Mod. (50 psi, %) |
|---|---|---|---|---|---|---|---|---|---|
| 1 (No Crosslinker) | 5 | 3740 | 160 | 2670 | 39 | | | | |
| | 10 | 4290 | 200 | 2670 | 32 | 42 | 394 | 20 | |
| | 20 | 3930 | 180 | 2520 | 38 | 52 | 70 | 26 | 65 |
| 2 (DMGDMA) | 5 | 4770 | 170 | 2660 | 31 | | | | |
| | 10 | 4290 | 190 | 2580 | 48 | 91 | 107 | 39 | 46 |
| | 20 | 4210 | 125 | 2430 | 41 | 111 | 79 | 47 | 29 |
| 3 (TAIC & DMGDMA) | 5 | 5280 | 200 | 2630 | 35 | | | | |
| | 10 | 4890 | 130 | 2640 | 37 | 148 | 71 | 64 | 17 |
| | 20 | 5120 | 110 | 2670 | 33 | 188 | 65 | 97 | 12 |
| 4 (TMPTMA & DMGDMA) | 5 | 5140 | 160 | 2710 | 30 | | | | |
| | 10 | 5640 | 150 | 2670 | 30 | 135 | 108 | 50 | 34 |
| | 20 | 4140 | 110 | 2650 | 35 | 124 | 83 | 57 | 21 |
| 6 (DMGDMA) | 5 | 4740 | 175 | 2650 | 32 | | | | |
| | 10 | 4580 | 160 | 2470 | 31 | 85 | 112 | 38 | 53 |
| | 20 | 4770 | 125 | 2650 | 30 | 82 | 49 | 51 | 21 |
| 8 (DMGDMA) | 5 | 2210 | 200 | 940 | | | | | |
| | 10 | 2650 | 190 | 790 | 1.8 | 76 | 118 | 31 | 60 |
| | 20 | 2470 | 110 | 950 | 2.0 | 111 | 72 | 48 | 23 |
| 10 (DMGDMA) | 5 | 1980 | 190 | 730 | | | | | |
| | 10 | 2370 | 160 | 640 | | 100 | 103 | 42 | 36 |
| | 20 | 2370 | 110 | 960 | 2.2 | 114 | 60 | 62 | 19 |

*1.5 MeV (RDI) electron beam accelerator
**0.5" depression at 0.2"/Min.

It will be seen from Table VI that the high temperature properties are considerably improved over the same polymers without crosslinking additives. It also shows that best results are achieved with crosslinker blends (samples 3 and 4).

EXAMPLE 5

The following table shows the mechanical properties at elevated temperature (250°C) of compression molded samples at 255°C to 260°C of a copolymer of ethylene-chlorotrifluoroethylene containing 6% of a crosslinking blend of various ratios of DMGDMA and triallyl cyanurate. All samples were irradiated at a 10 megarad dose.

TABLE VII

| Sample | % DMGDMA | % TAC | Tensile (psi)/ Elongation (%) at 250°C | Hot Modulus at 250°C/50 psi |
|---|---|---|---|---|
| 1 | 6 | 0 | 194/150 | 55 |
| 2 | 5 | 1 | 160/142 | 48 |
| 3 | 4 | 2 | 135/142 | 48 |
| 4 | 3 | 3 | 222/112 | 36 |
| 5 | 2 | 4 | 133/95 | 42 |
| 6 | 1 | 5 | 171/118 | 35 |

The following table shows the room and high temperature properties of a polymer blend of (a) a copolymer of 95% by weight vinylidene fluoride and 5% by weight tetrafluoroethylene and (b) a commercially available copolymer of vinylidene fluoride and hexafluoropropylene (Viton). The crosslinking additive was five parts per hundred of decamethylene glycol dimethacrylate (Sample 1), or a blend of three parts of DMGDMA with two parts of triallylisocyanurate (Sample 2) or with two parts of trimethylolpropane trimethacrylate (Sample 3).

TABLE VIII

| Sample | Dose[1] (Megarad) | Room Temperature (10"/min.) | | | | 250°C (10"/min.) | | | |
|---|---|---|---|---|---|---|---|---|---|
| | | T. S. (psi) | Elong. (%) | Yield (psi) | Flexural Stress (psi)[2] | T. S. (psi) | Elong. (%) | Yield (psi) | Hot Mod. (50 psi, %) |
| 1 | 10 | 3160 | 130 | 3220 | 27 | 71 | 70 | 34 | 40 |
|   | 20 | 3180 | 130 | 3230 | 23 | 90 | 49 | 42 | 20 |
| 2 | 10 | 3980 | 210 | 3330 | 27 | 147 | 78 | 63 | 20 |
|   | 20 | 3960 | 160 | 3830 | 31 | 130 | 50 | 67 | 14 |
| 3 | 10 | 3850 | 260 | 3430 | 23 | 93 | 114 | 29 | 45 |
|   | 20 | 3710 | 160 | 3570 | 24 | 100 | 73 | 45 | 25 |

[1] 1.5 MEV, (RDI) electron beam accelerator.
[2] 0.5" depression at 0.2"/min.

EXAMPLE 6

A powder blend, prepared as in the previous examples, was made of the following ingredients:

| | |
|---|---|
| Ethylene-chlorotrifluoroethylene polymer | 100 parts |
| Irganox 1010 (anti-oxidant) | 1 part |
| DMGDMA | 5 parts |
| Chrome green pigment | 0.5 parts |

The powder blend was rod extruded, pelletized and extruded onto wire at 12 rpm and 100 fpm with the rear barrel at 227°C, the center at 267°C and the front at 2-70°C. The head and die were 283°C. The wire was a 19 strand/32 guage AWG tinned copper wire of 0.038 inch O.D. The finished wire had 0.009 inch wall of insulation; the final O.D. was 0.056 inch. It was irradiated with a 10 megarad dose. The properties were as follows:

TABLE IX

| | |
|---|---|
| Tensile Strength | 7104 psi |
| Elongation at break | 70% |
| Insulation Resistance | 1 × 10[6] megohms/M' |
| Dielectric Breakdown | 11 KV |
| −65°C 4 hrs. 1" mandrel | passed (no cracking) |
| 200°C aging, 3 × mandrel wrap | 26 days, no cracking |
| Flammability | S E |
| Shrinkage (6 hrs. at 200°C) | None |
| Tape Abrasion (1 lb. load) | 15.3 inches |
| Hot Modulus (50 psi, 250°C) | 35 |

It can be seen that the improvement in properties of the extruded product are comparable to the improvements observed in the compression molded products, shown in Tables I, III and VI – VIII.

We claim:

1. A composition comprising a high temperature processing fluorocarbon polymer selected from the group consisting of ethylene-tetrafluroethylene copolymers, ethylene-chlorotrifluoroethylene copolymers, polyvinylidene fluoride homopolymers, tetrafluroethylene-vinylidene fluoride copolymers, tetrafluoroethylenehexafluoropropylene copolymers and vinylidene fluoride-hexafluoropropylene polymers, said polymer having incorporated therein a crosslinking agent for said polymer, said crosslinking agent comprising a dimethacrylate ester having the structural formula

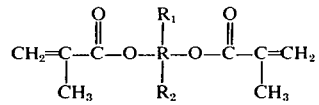

wherein R is a radical selected from the group consisting of alkyl, cycloalkyl and aralkyl radicals, having from 5 to 14 carbon atoms; $R_1$ and $R_2$ are independently selected from the group consisting of hydrogen, alkyl, cycloalkyl, aralkyl and aryl radicals and mixtures thereof; and the total number of carbon atoms in R, $R_1$ and $R_2$ is at least 10.

2. The composition of claim 1 in which the polymer is selected from the group consisting of (1) an ethylene-chlorotrifluoroethylene copolymer and (2) blends comprising vinylidene fluoride-hexafluoropropylene polymers and a polymer selected from the group consisting of (a) polyvinylidene fluoride and (b) ethylene-chlorotrifluoroethylene.

3. The composition of claim 1 in which the crosslinking agent is decamethylene glycol dimethacrylate.

4. The composition of claim 1 in which the crosslinking agent is hydrogenated bisphenol-A dimethacrylate.

5. The composition of claim 1 in which the crosslinking agent is a blend of the dimethacrylate ester and a tri-unsaturated crosslinking compound.

6. The composition of claim 2 in which the polymer is a blend of vinylidene fluoride-hexafluoropropylene polymers and a polymer selected from the group consisting of (a) polyvinylidene fluoride and (b) ethylene-chlorotrifuloroethylene.

7. The composition of claim 5 in which the tri-unsaturated crosslinking compound is triallyl cyanurate.

8. The composition of claim 5 in which the tri-unsaturated compound is triallyl isocyanurate.

9. The composition of claim 6 in which the crosslinking agent is a blend of the dimethacrylate ester and a tri-unsaturated crosslinking compound.

10. The irradiation cured composition of claim 1.

11. An extruded product of the irradiation cured composition of claim 1 on wire.

* * * * *

Disclaimer 3,894,118.—*Elihu J. Aronoff*, Framingham, *Kewal Sigh Dhami*, Shrewsbury, and *Tsu-Chia Shieh*, Framingham, Mass. CROSSLINKING AGENTS FOR FLUOROCARBON POLYMERS. Patent dated July 8, 1975. Disclaimer filed Dec. 16, 1977, by the assignee, *International Telephone and Telegraph Corporation*.

Hereby enters this disclaimer to claim 11 of said patent.

[*Official Gazette March 7, 1978.*]